(12) United States Patent
Cruz-Hernandez et al.

(10) Patent No.: US 10,936,068 B2
(45) Date of Patent: Mar. 2, 2021

(54) REFERENCE SIGNAL VARIATION FOR GENERATING CRISP HAPTIC EFFECTS

(71) Applicant: Immersion Corporation, San Jose, CA (US)

(72) Inventors: Juan Manuel Cruz-Hernandez, Westmount (CA); Danny A. Grant, Laval (CA); Christopher Ullrich, Ventura, CA (US); Kaniyalal Shah, Fremont, CA (US)

(73) Assignee: IMMERSION CORPORATION, San Jose, CA (US)

( * ) Notice: Subject to any disclaimer, the term of this patent is extended or adjusted under 35 U.S.C. 154(b) by 25 days.

(21) Appl. No.: 16/010,370

(22) Filed: Jun. 15, 2018

(65) Prior Publication Data
US 2019/0384400 A1    Dec. 19, 2019

(51) Int. Cl.
*G06F 3/01*    (2006.01)
(52) U.S. Cl.
CPC .................................... *G06F 3/016* (2013.01)
(58) Field of Classification Search
CPC .................................... G06F 1/00; A61M 1/00
See application file for complete search history.

(56) References Cited

U.S. PATENT DOCUMENTS

| 2010/0309141 | A1 | 12/2010 | Cruz-Hernandez et al. |
| 2013/0194084 | A1* | 8/2013 | Lacroix .................. G06F 3/016 340/407.1 |
| 2014/0247227 | A1 | 9/2014 | Jiang et al. |
| 2015/0051519 | A1* | 2/2015 | Morbi ...................... A61H 1/02 601/26 |
| 2016/0063826 | A1* | 3/2016 | Morrell ............... H04L 12/1895 340/407.1 |
| 2016/0155305 | A1* | 6/2016 | Barsilai ................... G06F 3/016 340/407.1 |
| 2016/0239089 | A1* | 8/2016 | Taninaka ................. B06B 1/06 |
| 2018/0204426 | A1* | 7/2018 | Nagisetty ............... H04B 1/385 |
| 2019/0295755 | A1* | 9/2019 | Konradi .................. G06F 3/016 |

FOREIGN PATENT DOCUMENTS

| EP | 2772832 A2 | 9/2014 |
| EP | 3211504 A1 | 8/2017 |

OTHER PUBLICATIONS

TEXAS INSTRUMENTS: "DRV2625 Ultra Low Power Closed-Loop LRA/ERM Haptic Driver with Built-In Library," Sep. 30, 2016, XP055629370, Retrieved from the Internet: URL:https://www.ti.com/lit/gpn/DRV2625 [retrieved on Oct. 7, 2019].

* cited by examiner

*Primary Examiner* — Shirley Lu
(74) *Attorney, Agent, or Firm* — Nath, Goldberg & Meyer; Gregory B. Kang

(57) ABSTRACT

Systems, methods, and instructions for driving an actuator using an open-loop drive circuit that generate, at a processor, a reference input signal according to a predetermined or predicted command signal, supply the reference input signal to an amplifier to generate a command signal, and supply the command signal to the haptic output device to render a haptic effect.

20 Claims, 5 Drawing Sheets

… (1)

REFERENCE SIGNAL VARIATION FOR GENERATING CRISP HAPTIC EFFECTS

FIELD OF INVENTION

The embodiments of the present invention are generally directed to electronic devices that generate crisp haptic effects, and more particularly, to reference signal variation for generating crisp haptic effects.

BACKGROUND

Electronic device manufacturers strive to produce a rich interface for users. Conventional devices use visual and auditory cues to provide feedback to a user. In some interface devices, kinesthetic feedback (e.g., active and resistive force feedback) and/or tactile feedback (e.g., vibration, texture, and heat) is also provided to the user, more generally known collectively as "haptic feedback" or "haptic effects." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

With the continued development of mobile devices, such as smartphones and tablets, users are now able to view high definition audio and video on a handheld device that traditionally could only be seen in movie theaters, television or home theater systems. With haptically-enabled mobile devices, content viewing is sufficiently enhanced, and viewers generally prefer a haptic content component in addition to the audio and video content components. However, in order to be compatible with the high definition audio/video, for example, crisper haptic effects are needed, and provided herein.

SUMMARY OF THE INVENTION

Embodiments of the present invention are generally directed to electronic devices that generate crisp haptic effects, and more particularly, to reference signal variation for generating crisp haptic effects that substantially improve upon the related art.

Features and advantages of the embodiments are set forth in the description which follows, or will be apparent from the description, or may be learned by practice of the invention.

In one example, systems, methods, and instructions for driving an actuator using an open-loop drive circuit that generate, at a processor, a reference input signal according to a predetermined or predicted command signal, supply the reference input signal to an amplifier to generate a command signal, and supply the command signal to the haptic output device to render a haptic effect.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Reference will now be made in detail to embodiments, examples of which are illustrated by the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

The example embodiments are generally directed toward an improved haptic drive circuit. In each of the various embodiments, an open-loop haptic drive circuit is configured to generate "crisp" haptic (vibrotactile) effect by modifying the reference input signal to manipulate and otherwise control the generated haptic effect. Use of an expensive output sensor and a closed-loop feedback signal (as used in a closed-loop haptic drive circuit) are eliminated.

Figure 1:
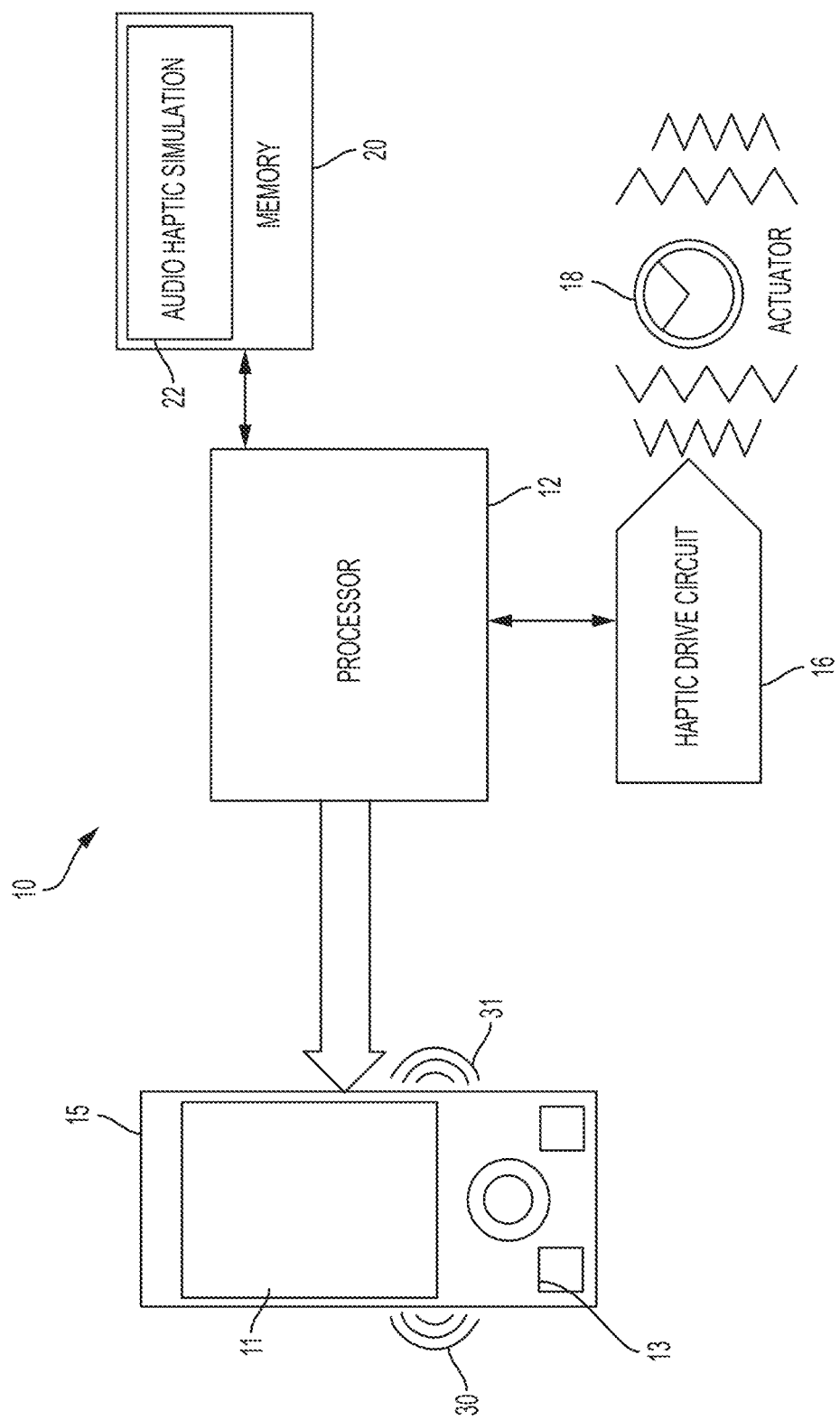
FIG. 1 is a block diagram of a haptically-enabled system/device according to an example embodiment of the present invention.

FIG. 1 is a block diagram of a haptically-enabled system/device 10 according to an example embodiment of the present invention. System 10 includes a touch or pressure sensitive surface 11 or other type of user interface mounted within a housing 15, and may include mechanical keys/buttons 13.

Internal to system 10 is a haptic feedback system that generates haptic effects on system 10 and includes a processor or controller 12. Coupled to processor 12 is a memory 20, and a haptic drive circuit 16 which is coupled to an actuator 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction. The haptic feedback system in one embodiment generates vibrations 30, 31 or other types of haptic effects on system 10.

Processor 12 outputs the control signals to haptic drive circuit 16, which includes electronic components and circuitry used to supply actuator 18 with the required electrical current and voltage (i.e., "motor signals") to cause the desired haptic effects. System 10 may include more than one actuator 18, and each actuator may include a separate haptic drive circuit 16, all coupled to a common processor 12.

Haptic drive circuit 16 is configured to generate one or more haptic drive signals. For example, the haptic drive signal may be generated at and around the resonance frequency (e.g. +/−20 Hz, 30 Hz, 40 Hz, etc.) of actuator 18. In certain embodiments, haptic drive circuit 16 may comprise a variety of signal processing stages, each stage defining a subset of the signal processing stages applied to generate the haptic command signal.

Non-transitory memory 20 may include a variety of computer-readable media that may be accessed by processor 12. In the various embodiments, memory 20 and other memory devices described herein may include a volatile and nonvolatile medium, removable and non-removable medium. For example, memory 20 may include any combination of random access memory ("RAM"), dynamic RAM ("DRAM"), static RAM ("SRAM"), read only memory ("ROM"), flash memory, cache memory, and/or any other type of non-transitory computer-readable medium. Memory 20 stores instructions executed by processor 12. Among the instructions, memory 20 includes audio haptic simulation module 22, which are instructions that, when executed by processor 12, generates high bandwidth haptic effects using speaker and actuator 18, as disclosed in more detail below. Memory 20 may also be located internal to processor 12, or any combination of internal and external memory.

System 10 may be any type of handheld/mobile device, such as a cellular telephone, personal digital assistant ("PDA"), smartphone, computer tablet, gaming console, remote control, or any other type of device that includes a haptic effect system that includes one or more actuators. System 10 may be a wearable device such as wrist bands, headbands, eyeglasses, rings, leg bands, arrays integrated into clothing, etc., or any other type of device that a user may wear on a body or can be held by a user and that is haptically enabled, including furniture or a vehicle steering wheel. Further, some of the elements or functionality of system 10 may be remotely located or may be implemented by another device that is in communication with the remaining elements of system 10.

Actuator 18 may be any type of actuator or haptic output device that can generate a haptic effect. In general, an actuator is an example of a haptic output device, where a haptic output device is a device configured to output haptic effects, such as vibrotactile haptic effects, electrostatic friction haptic effects, temperature variation, and/or deformation haptic effects, in response to a drive signal. Although the term actuator may be used throughout the detailed description, the embodiments of the invention may be readily applied to a variety of haptic output devices. Actuator 18 may be, for example, an electric motor, an electro-magnetic actuator, a voice coil, a shape memory alloy, an electro-active polymer, a solenoid, an eccentric rotating mass motor ("ERM"), a harmonic ERM motor ("HERM"), a linear resonance actuator ("LRA") a solenoid resonance actuator ("SRA"), a piezoelectric actuator, a macro fiber composite ("MFC") actuator, a high bandwidth actuator, an electroactive polymer ("EAP") actuator, an electrostatic friction display, an ultrasonic vibration generator, or the like. In some instances, the actuator itself may include a haptic drive circuit.

Currently, there is a high degree of variance between similarly rated actuators. As a result, the similarly rated actuators often produce inconsistent haptic responses. The variance is especially large between different actuator manufacturers, but is still significant among actuators produced by a single manufacturer. Variance between similarly rated actuators is especially perceptible for the generation of "crisp" haptic effects.

Crisp haptic effects include short duration haptic effects (e.g., 5 ms) that reach a substantially high or peak acceleration value (e.g., 2.5 peak to peak gravities, or 3.5 Gpp). In other words, during the generation of a crisp haptic effect, the actuator may reach a high or peak acceleration in less than one cycle. In addition, the actuator returns to a stopped position within 5 ms after the drive signal is removed.

The generation of crisp haptic effects is subject to numerous drawbacks. For example, some known techniques at most function with high resonant systems and are unable to produce high acceleration values in a short duration (e.g., 5 ms). Generation of high acceleration haptic effects within 5 ms generally uses an actuator that generates vibrations in the range of 100 Hz and over. For example, a single oscillation to drive a haptic effect may have duration of 10 ms, and thus, by the mid-point of the driving signal, that is 5 ms, the acceleration is already high. Other known techniques attempt to modify the haptic drive signal by using a closed-loop haptic drive circuit, such as closed-loop haptic drive circuit 200 depicted in FIG. 2. Such known drive circuits have been adapted to produce "crisp" haptic effects. However, such techniques are overly complex and costly due to the incorporation of expensive sensors.

Figure 2:
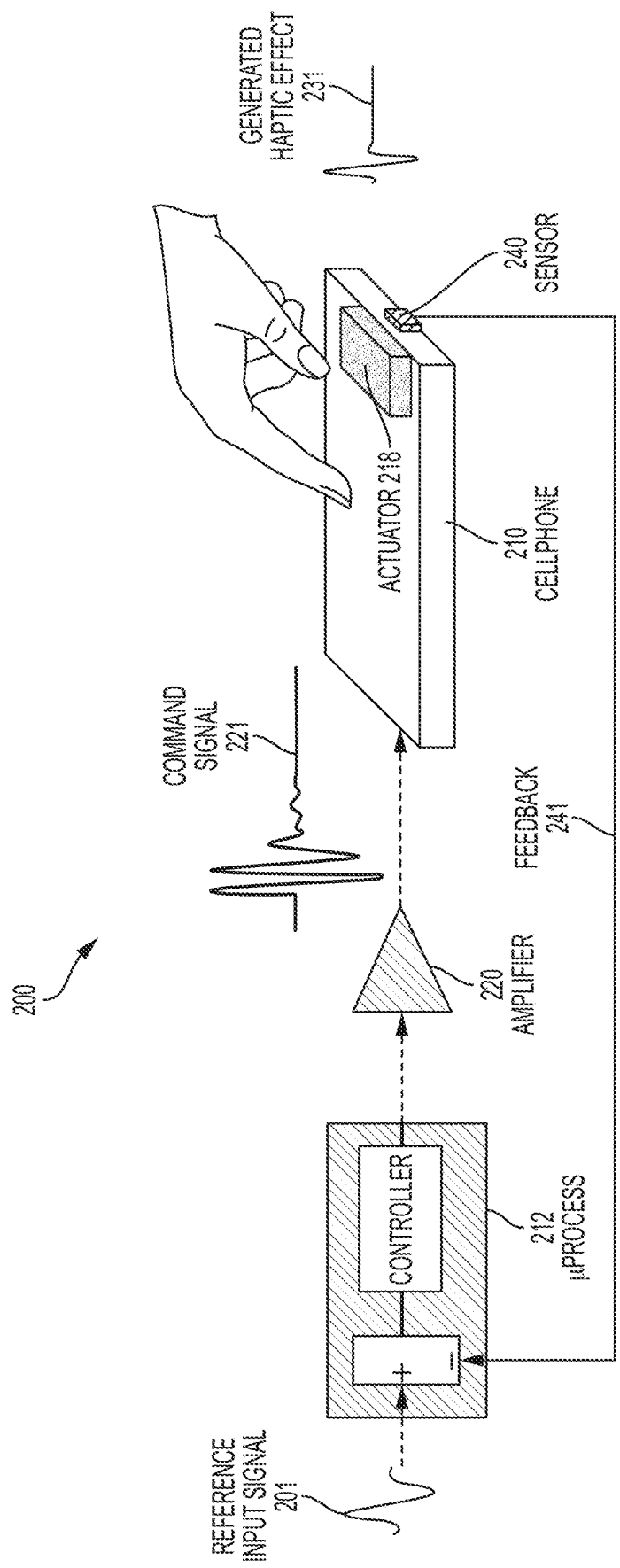
FIG. 2 illustrates a known closed-loop haptic drive circuit for generating a haptic command signal and a crisp haptic effect.

FIG. 2 illustrates a known closed-loop haptic drive circuit 200 for generating a haptic command signal and a crisp haptic effect. As illustrated in FIG. 2, closed-loop haptic drive circuit 200 includes an electronic device 210 (e.g., smartphone, tablet, or other portable electronic device) that includes microprocessor/controller 212, amplifier 220, actuator 218, and sensor 240.

Microprocessor/controller 212 may be implemented as a separate microprocessor and controller, or alternatively, may be integrated as a single device. Microprocessor/controller 212 may include a variety of configurations, such as those described in connection with processor 12 of FIG. 1. In some embodiments, microprocessor/controller 212 may be an application processor, such as a smartphone application processor. Amplifier 220 may be any known amplifier that is configured to increase the power of a received input signal, such as a post-processed reference input signal. Amplifier 220 may be configured to increase the voltage magnitude or current magnitude of the post-processed reference input signal. Actuator 218 may include any haptic output device, such as the various haptic output devices described in connection with actuator 18 of FIG. 1. Sensor 240 may be any known sensor that is configured to continually or periodically monitor the vibrations output by actuator 218.

Microprocessor/controller 212 is configured to receive reference input signal 201, such as a single oscillation input signal that specifies a crisp haptic effect to be played by electronic device 210. As illustrated in FIG. 2, reference input signal 201 is a single oscillation signal. After being processed by microprocessor/controller 212 and amplifier 220, a command signal 221 is generated. Command signal 221 is supplied to actuator 218. At this stage of closed-loop haptic drive circuit 200, however, command signal 221 may no longer comprise a single oscillation signal. Instead, the form or shape of command signal 221 may differ from reference input signal 201, and may include multiple oscillations or cycles.

Here, microprocessor/controller 212 is configured to make adjustments to reference input signal 201 based upon the individual characteristics of actuator 218. For example, although actuator 218 may be rated to have particular characteristics, such as the resonant frequency, manufacturing tolerances typically produce actuators within a range of the rated characteristics, such as +/−20 Hz of the resonant frequency. In closed-loop haptic drive circuit 200, microprocessor/controller 212 may adjust reference input signal 201 based upon real-time actuator data received from sensor 240 via closed-loop feedback signal 241. In turn, the resulting command signal 221 eliminates unwanted vibrations as compared to the haptic effect intended by reference input signal 201.

When processing command signal 221, actuator 218 is engaged to render haptic feedback. Here, sensor 240 monitors the haptic feedback produced by actuator 218 and makes corrections, in real-time or near real-time, to develop the desired generated haptic effect, such as generated haptic effect 231. By applying the closed-loop feedback signal 241 to microprocessor/controller 212, the haptic effect, such as generated haptic effect 231, may be generated as a crisp haptic effect and as intended by reference input signal 201. Unfortunately, sensor 240 is typically a high cost component, and its continual use more quickly drains the battery of electronic device 210.

As an alternative to the closed-loop architecture, such as closed-loop haptic drive circuit 200, some known haptic drive circuits use an open-loop architecture. Until now, known open-loop haptic drive circuits have also been problematic. Typically, known open-loop haptic drive circuits are configured to drive the actuator for a first oscillation. In turn, the first oscillation is thereafter followed by a second oscillation that is 180 degrees phase-shifted. Here, the second oscillation is configured to stop the first oscillation. However, due to the high degree of variance between similarly rated actuators, the second oscillation cannot be relied upon to effectively stop the actuator. Accordingly, the more expensive closed-loop architecture has so far been preferred.

Figure 3:
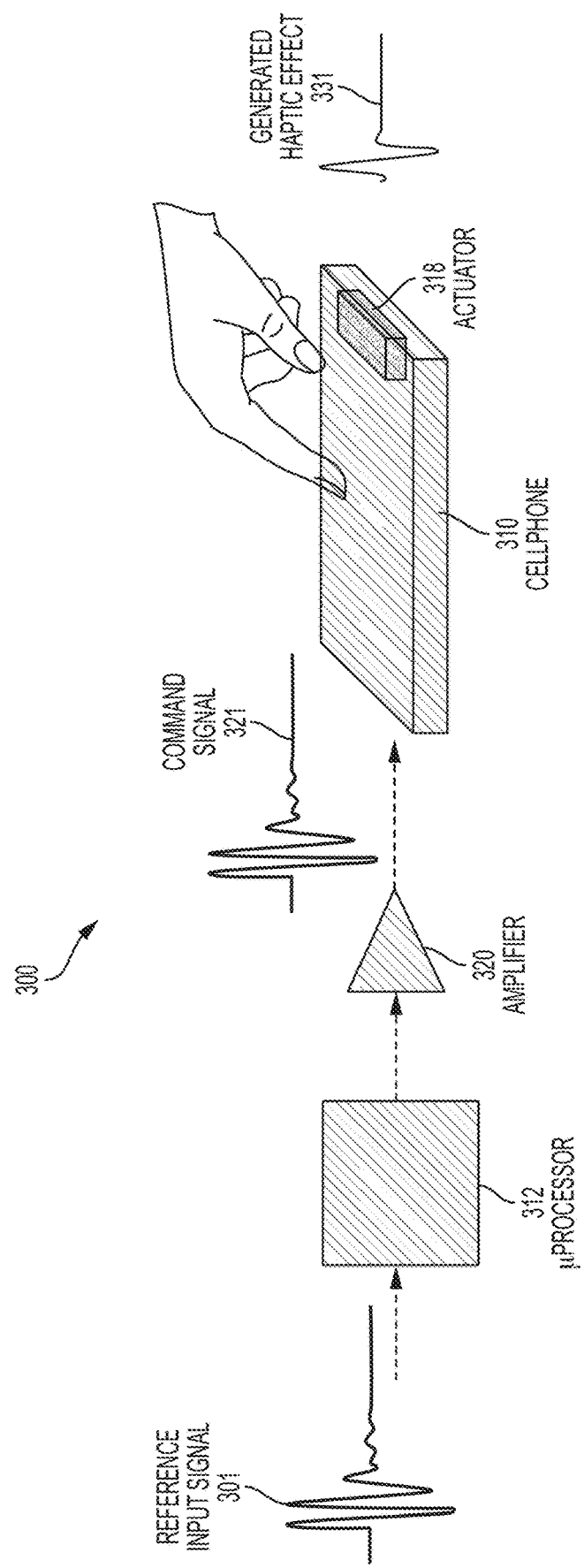
FIG. 3 illustrates an open-loop haptic drive circuit for generating a haptic command signal and a crisp haptic effect according to an example embodiment of the present invention.

FIG. 3 illustrates an open-loop haptic drive circuit 300 for generating a haptic command signal and a crisp haptic effect according to an example embodiment of the present invention. As illustrated in FIG. 3, open-loop haptic drive circuit 300 includes an electronic device 310 (e.g., smartphone, tablet, or other portable electronic device) that includes microprocessor/controller 312, amplifier 320, and actuator 318.

As compared with closed-loop haptic drive circuit 200 of FIG. 2, open-loop haptic drive circuit 300 does not include a costly sensor 240 and the corresponding closed-loop feedback signal 241. Instead, the embodiments of the present invention vary reference input signal 301 in order to reliably achieve crisp haptic effects.

Microprocessor/controller 312 may be implemented as a separate microprocessor and controller, or alternatively, may be integrated as a single device. For example, a dedicated processor may be used to execute one or more calibration algorithms to determine or predict an actuator profile of actuator 318. Alternatively, the actuator profile may be determined by microprocessor/controller 312. In another example, the calibration information or the actuator profile may be stored within microprocessor/controller 312 or stored within a coupled non-transitory memory (not shown). Microprocessor/controller 312 may include a variety of configurations, such as those described in connection with processor 12 of FIG. 1. In some embodiments, microprocessor/controller 212 may be an application processor, such as a smartphone application processor. Amplifier 320 may be any known amplifier that is configured to increase the power of a received input signal, such as the post-processed reference input signal. Amplifier 320 may be configured to increase the voltage magnitude or current magnitude of the post-processed reference input signal. Actuator 318 may include any haptic output device, such as the haptic output devices described in connection with actuator 18 of FIG. 1.

Microprocessor/controller 312 is configured to receive reference input signal 301. Here, microprocessor/controller 312 is configured to make adjustments to reference input signal 301 without real-time feedback of actuator 318. Instead, microprocessor/controller 312 may execute one or more calibration algorithms to determine or predict an actuator profile and/or characteristics of actuator 318. As discussed above, although actuator 318 may be rated to have particular characteristics, such as the resonant frequency, manufacturing tolerances typically produce actuators within a range of the rated characteristics, such as +/−20 Hz of the resonant frequency. The execution of one or more calibration algorithms captures and stores such variations that occur between similarly rated actuators.

In open-loop haptic drive circuit 300, microprocessor/controller 312 also may adjust reference input signal 301 based upon a predetermined command signal. For example, reference input signal 301 may include a predetermined command signal (e.g., such as command signal 221 of FIG. 2). Alternatively, or additionally, microprocessor/controller 312 may adjust reference input signal 301 based upon one or more calibration algorithms configured to determine or predict characteristics of actuator 318, such as the resonant frequency. In other words, microprocessor/controller 312 is configured to determine a predicted actuator profile and/or characteristics of actuator 318. In turn, the resulting command signal 321 eliminates unwanted vibrations as compared to the haptic effect that would otherwise be produced by reference input signal 301. Such unwanted vibrations occur, in part, due to variations in actuator characteristics. Accordingly, and for example, instead of including a single oscillation input signal corresponding to a crisp haptic effect, reference input signal 301 is varied and may include a variety of forms or shapes to produce the desired generated haptic effect 331, namely a crisp haptic effect. In some embodiments, the predicted command signal may be applied as the reference input signal prior to processing by microprocessor/controller 312 and amplifier 320.

Accordingly, as illustrated in FIG. 3, reference input signal 301 may include multiple cycles (i.e., not a single oscillation). After being processed by microprocessor/controller 312 and amplified by amplifier 320, the resulting command signal 321 is supplied to actuator 318. The resulting signal, such as command signal 321, is supplied to actuator 318, and haptic effect 331 is rendered.

To achieve a crisp haptic effect, a braking signal may be included in reference input signal 301. For example, a braking signal may be iteratively applied after each oscillation of reference input signal 301 (e.g., first, second, third oscillation, and so on), and the subsequent reference input signals may be delayed until braking occurs in haptic effect 331. In turn, such braking signal(s) may be stored for use as a future reference input signal and for rendering of subsequent haptic effects. Here, it is also noted that the oscillations of subsequent reference input signals may have different frequencies.

The embodiments of the present invention are directed to an internal solution at the integrated circuit level of the haptic driver circuit (e.g., haptic driver circuit 16 of FIG. 1 and open-loop haptic drive circuit 300). According to the embodiments of the present invention, the command signal, which is configured to drive the actuator, is shaped to generate the desired crisp haptic effect. Typically, the command signal is a sinusoidal signal that is configured to drive the actuator. In some instances, the command signal may take a variety of forms or shapes so long as the resulting acceleration produced by the actuator has the characteristics of a crisp haptic effect. In some embodiments, very high frequency pulses may be used to push or pull the actuator at specific points in time. For example, the energy of the pulses may be the same as the energy in a sinusoid signal at a specific frequency.

Figure 4:
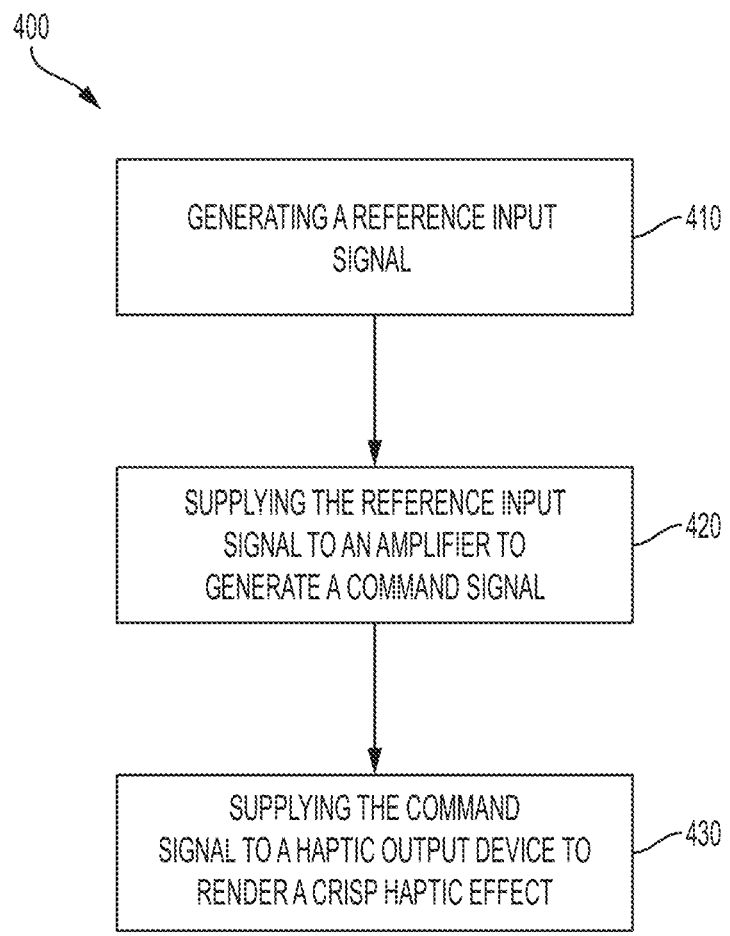
FIG. 4 illustrates a method for driving an actuator according to an example embodiment of the present invention.

FIG. 4 illustrates a functionality 400 for driving an actuator according to an example embodiment of the present invention. In particular, functionality 400 is configured to generate a crisp haptic effect. In some instances, functionality 400 of the flow diagram of FIG. 4 is implemented by software stored in non-transitory memory or other computer readable or tangible media, and executed by a processor. In other instances, the functionality may be performed by hardware (e.g., through the use of an application specific integrated circuit ("ASIC"), a programmable gate array ("PGA"), a field programmable gate array ("FPGA"), etc.), or any combination of hardware and software.

At the outset, functionality 400 may generate a reference input signal that is configured to render one or more haptic effects. Although not shown, an initial reference input signal corresponding to one or more haptic effects may be optionally received at a microprocessor/controller (e.g., processor 12 of FIG. 1 or microprocessor/controller 312 of FIG. 3) of an open-loop drive circuit (e.g., open-loop drive circuit 300 of FIG. 3). At 410, functionality 400 may generate, adjust, or otherwise manipulate the reference input signal based upon a predetermined command signal. For example, the reference input signal may include, or be based upon, a predetermined command signal (e.g., such as command signal 221 of FIG. 2). Alternatively, or additionally, functionality 400 may adjust the reference input signal based upon one or more calibration algorithms configured to determine or predict one or more characteristics of the actuator, such as the resonant frequency. In other words, the reference input signal may include a predetermined or predicted command signal. In some instances, such as in the generation of crisp haptic effects, the reference input signal may include one or more braking component signals.

Additionally, or alternatively, functionality 400 may use one or more calibration algorithms to determine or predict actuator profile and/or actuator information. The actuator profile and/or information may be used to generate the reference input signal. The resonance frequencies, for example, may be determined using a variety of techniques. For example, the resonance frequencies may be automatically determined by monitoring the operation of the actuator. Alternatively, the resonance frequencies may be supplied by the actuator or may be determined by using a look-up table. In yet another example, the resonance frequencies may be determined using one or more back electromotive force ("back-EMF") algorithms.

Next, at 420, the reference input signal (e.g., the predicted command signal) is amplified at an amplifier (e.g., amplifier 320 of FIG. 3) to generate the command signal. Lastly, at 430, the command signal is supplied to the haptic output device to render a crisp haptic effect. Thus, by shaping the reference input signal, crisp haptic effects may be provided.

Figure 5:
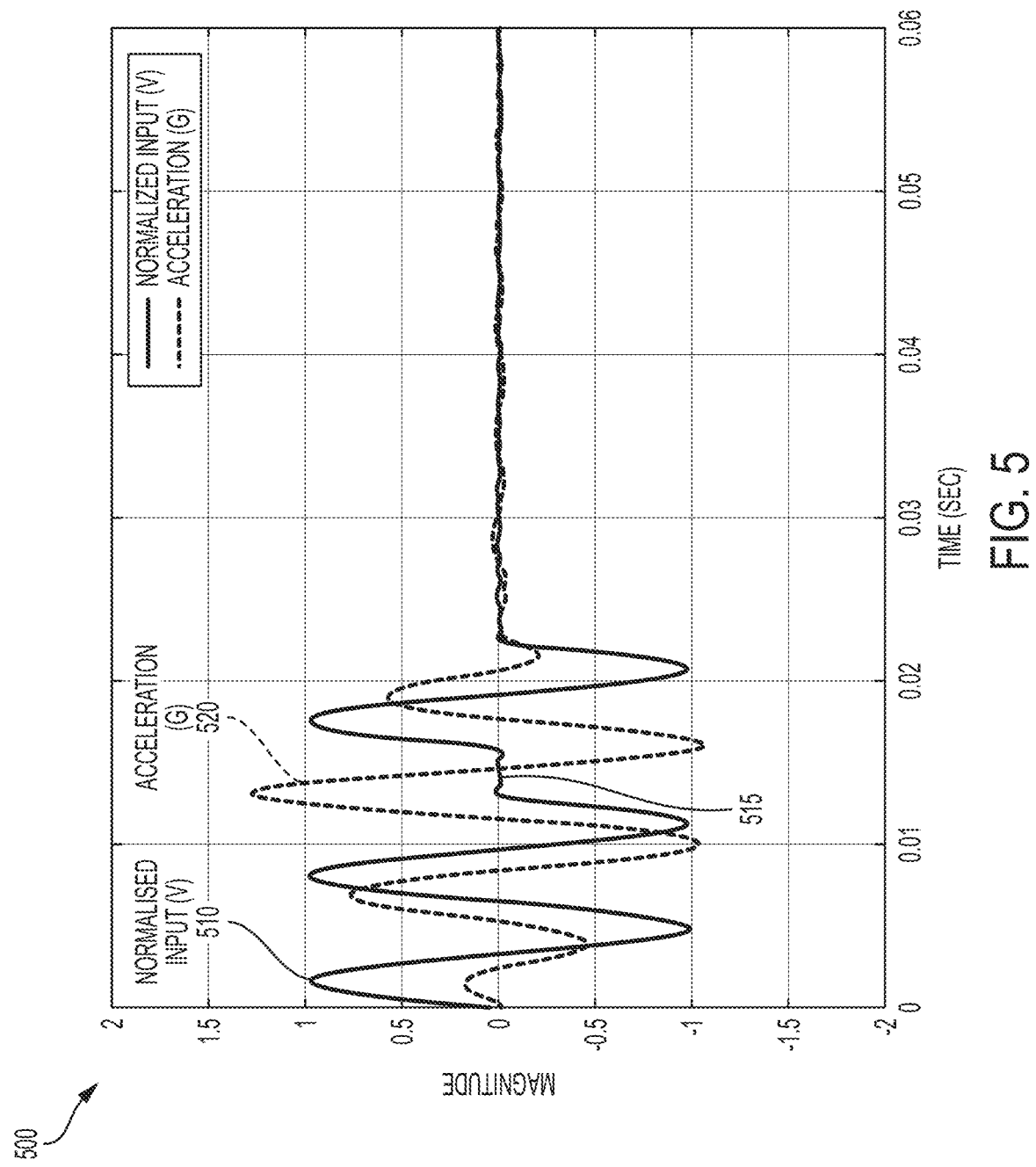
FIG. 5 illustrates use of a reference input signal as a braking signal in an open-loop drive circuit according to an example embodiment of the present invention.

FIG. 5 illustrates use of a reference input signal as a braking signal in an open-loop drive circuit according to an example embodiment of the present invention. As illustrated in FIG. 5, a normalized input voltage 510 of the reference input signal, depicted as a solid line, and an acceleration 520 of the actuator, depicted as a dashed line, are shown versus time. In particular, an example form or shape of the reference input signal that achieves a crisp haptic effect is depicted.

Here, reference input signal 510 includes two oscillations or cycles that drive the actuator and one oscillation or cycle to stop the actuator. As depicted, there is a "gap" 515 after the first two oscillations or cycles of reference input signal 510. Gap 515 generates a phase inversion timing that results in the next cycle being a braking signal after which the acceleration 520 of the actuator quickly drops off. The resulting crisp haptic effect is produced because the actuator does not oscillate for more than an additional 5 ms. In some instances, and in order to get an even shorter haptic effect, a single oscillation may be used to drive the actuator, and one oscillation may be used to stop its vibrations. In an alternative embodiment, one or more high-frequency brake pulses to may be used to quickly (e.g., within 5 ms) cancel or dampen acceleration of the actuator.

As discussed above, the embodiments of the invention provide crisp haptic effects at a much reduced cost as compared to known techniques. In each of the various embodiments described herein, an open-loop haptic drive circuit is configured to generate crisp haptic effects by modifying the reference input signal to quickly stop vibrations of an actuator. Use of an expensive output sensor and a closed-loop feedback signal are eliminated. Additionally, because manufacturing variations in actuators are more easily compensated for, actuator manufacturing processes may be simplified.

One having ordinary skill in the art will readily understand that the invention as discussed above may be practiced with steps in a different order, and/or with elements in configurations which are different than those which are disclosed. Additionally, one of ordinary skill in the art will readily understand that features of the various embodiments may be practiced in various combinations. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for driving a haptic output device using an open-loop haptic drive circuit, the method comprising:
   generating, at a processor, a reference input signal without real-time feedback from the haptic output device, based on:
      a predetermined or predicted command signal generated from a closed-loop circuit; and
      an actuator profile representative of at least one characteristic of the haptic output device;
   supplying the reference input signal to an amplifier to generate a command signal; and
   supplying the command signal to the haptic output device to render a haptic effect.

2. The method for driving a haptic output device using an open-loop haptic drive circuit according to claim 1, wherein the reference input signal includes one or more braking signals.

3. The method for driving a haptic output device using an open-loop haptic drive circuit according to claim 1, wherein oscillations of the haptic effect stop within 5 ms of a braking signal.

4. The method for driving a haptic output device using an open-loop haptic drive circuit according to claim 1, wherein the reference input signal is determined according to a resonant frequency of the haptic output device.

5. The method for driving the haptic output device using an open-loop haptic drive circuit according to claim 4, wherein the resonant frequency is determined by monitoring operation of the haptic output device.

6. The method for driving a haptic output device using an open-loop haptic drive circuit according to claim 1, wherein the command signal is further generated according to a resonant frequency of the haptic output device.

7. A device for driving a haptic output device using an open-loop haptic drive circuit, the device comprising:
 a processor; and
 a memory storing one or more programs for execution by the processor, the one or more programs including instructions for:
  generating, at the processor, a reference input signal without real-time feedback from the haptic output device, based on:
   a predetermined or predicted command signal generated from a closed-loop system; and
   an actuator profile representative of at least one characteristic of the haptic output device;
  supplying the reference input signal to an amplifier to generate a command signal; and
  supplying the command signal to the haptic output device to render a haptic effect.

8. The device for driving a haptic output device using an open-loop haptic drive circuit according to claim 7, wherein the reference input signal includes one or more braking signals.

9. The device for driving a haptic output device using an open-loop haptic drive circuit according to claim 7, wherein oscillations of the haptic effect stop within 5 ms of a braking signal.

10. The device for driving a haptic output device using an open-loop haptic drive circuit according to claim 7, wherein the reference input signal is determined according to a resonant frequency of the haptic output device.

11. The device for driving the haptic output device using an open-loop haptic drive circuit according to claim 10, wherein the resonant frequency is determined by monitoring operation of the haptic output device.

12. The device for driving a haptic output device using an open-loop haptic drive circuit according to claim 7, wherein the command signal is further generated according to a resonant frequency of the haptic output device.

13. A non-transitory computer readable storage medium storing one or more programs configured to be executed by a processor, the one or more programs for driving a haptic output device using an open-loop haptic drive circuit, the one or more programs including instructions for:
 generating, at the processor, a reference input signal without real-time feedback from the haptic output device, based on:
  a predetermined or predicted command signal generated from a closed-loop system; and
  an actuator profile representative of at least one characteristic of the haptic output device;
 supplying the reference input signal to an amplifier to generate a command signal; and
 supplying the command signal to the haptic output device to render a haptic effect.

14. The non-transitory computer readable storage according to claim 13, wherein the reference input signal includes one or more braking signals.

15. The non-transitory computer readable storage according to claim 13, wherein oscillations of the haptic effect stop within 5 ms of a braking signal.

16. The non-transitory computer readable storage according to claim 13, wherein the reference input signal is determined according to a resonant frequency of the haptic output device.

17. The non-transitory computer readable storage according to claim 16, wherein the resonant frequency is determined by monitoring operation of the haptic output device.

18. The non-transitory computer readable storage according to claim 13, wherein the command signal is further generated according to a resonant frequency of the haptic output device.

19. The method for driving a haptic output device using an open-loop haptic drive circuit according to claim 1, wherein the predetermined or predicted command signal is based on a stored actuator profile representative of at least one characteristic of the haptic output device.

20. The device for driving a haptic output device using an open-loop haptic drive circuit according to claim 7, wherein the predetermined or predicted command signal is based on a stored actuator profile representative of at least one characteristic of the haptic output device.

* * * * *